United States Patent
Francis

(10) Patent No.: US 8,673,201 B2
(45) Date of Patent: Mar. 18, 2014

(54) NON-CEMENT FIRE DOOR CORE

(75) Inventor: Hubert C. Francis, Lithonia, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

(21) Appl. No.: 13/493,345

(22) Filed: Jun. 11, 2012

(65) Prior Publication Data

US 2012/0248655 A1  Oct. 4, 2012

Related U.S. Application Data

(62) Division of application No. 11/955,461, filed on Dec. 13, 2007, now Pat. No. 8,221,542.

(51) Int. Cl.
*B29C 67/24* (2006.01)

(52) U.S. Cl.
USPC .......................................................... 264/330

(58) Field of Classification Search
USPC .......................................................... 264/330
See application file for complete search history.

(56) References Cited

U.S. PATENT DOCUMENTS

| | | | |
|---|---|---|---|
| 3,988,199 A | 10/1976 | Hillmer et al. | |
| 4,159,302 A | 6/1979 | Greve et al. | |
| 4,343,127 A | 8/1982 | Greve et al. | |
| 4,695,494 A | 9/1987 | Fowler et al. | |
| 4,748,771 A | 6/1988 | Lehnert et al. | |
| 4,811,538 A | 3/1989 | Lehnert et al. | |
| 5,155,959 A | 10/1992 | Richards et al. | |
| 5,171,366 A | 12/1992 | Richards et al. | |
| 5,305,577 A | 4/1994 | Richards et al. | |
| 5,347,780 A | 9/1994 | Richards et al. | |
| 5,601,888 A | 2/1997 | Fowler | |
| 5,632,848 A | 5/1997 | Richards et al. | |
| 5,723,226 A | 3/1998 | Francis et al. | |
| 5,798,010 A | 8/1998 | Richards et al. | |
| 5,922,447 A | 7/1999 | Baig | |
| 5,945,182 A | 8/1999 | Fowler et al. | |
| 5,945,208 A | 8/1999 | Richards et al. | |
| 6,299,970 B1 | 10/2001 | Richards et al. | |
| 6,340,389 B1 | 1/2002 | Klus | |
| 6,554,893 B2 | 4/2003 | Klus | |
| 6,648,965 B2 | 11/2003 | Klus | |
| 6,846,358 B2 | 1/2005 | Francis | |
| 8,221,542 B2 | 7/2012 | Francis | |
| 2004/0211338 A1 | 10/2004 | Francis | |

*Primary Examiner* — Larry Thrower
*Assistant Examiner* — Xue Liu
(74) *Attorney, Agent, or Firm* — Ram W. Sabnis

(57) ABSTRACT

The present invention describes a fire resistant building material composition, useful for example as a fire door core and to a method of making this composition. The building material of the present invention is prepared from an aqueous mixture of predominately expanded perlite, a small amount of a binder component consisting essentially of calcined gypsum and an organic binder, and optionally a fibrous reinforcement.

20 Claims, No Drawings

NON-CEMENT FIRE DOOR CORE

CROSS-REFERENCE TO RELATED APPLICATIONS

This application is a Divisional Application of (co-pending) U.S. application Ser. No. 11/955,461, filed on Dec. 13, 2007, which is hereby incorporated by reference in its entirety.

TECHNICAL FIELD

This invention is in the field of building materials, especially fire-resistant building materials. Specifically, this invention describes a building material composition that is substantially free of a hydraulic cement such as Portland cement, (also referred to as a non-cement-containing composition) having utility as an improved core composition for fire-resistant doors and methods of manufacturing the improved fire door core composition.

BACKGROUND OF THE INVENTION

Fire doors are generally made for the purpose of stopping or delaying the transfer of thermal energy (i.e., heat), from one side of the door to the other side. Current fire-resistant doors generally contain a fire-resistant core usually encased in a door-shaped shell, wherein the shell is made from various materials generally known to those of ordinary skill in the art. The core is customarily bonded or glued to both inside surfaces of the shell.

Fire doors, as used in residential, commercial, and industrial applications, typically are employed in conjunction with fire walls to provide fire protection between different zones of a structure, and particularly to isolate high fire risk areas of a building from the remainder of the structure, such as the garage of a dwelling from its living quarters. Fire doors usually are not capable of indefinitely withstanding the high temperature conditions of a fire but, rather, are designed to maintain the integrity of the firewall for a limited time to permit the occupants of a building to escape and to delay the spread of fire until fire control equipment can be brought to the scene.

Various tests have been designed for fire doors and are based on factors, such as the time that a given door would withstand a certain temperature while maintaining its integrity, and hose stream tests which involve the door's ability to withstand the forces of a high pressure water stream. The American Society for Testing Materials (ASTM) has devised tests to establish fire door standards and these standards are incorporated into building codes and architectural specifications. One such standard, ASTM Method E 152, requires a door to maintain its integrity for period ranging up to 1.5 hours while withstanding progressively higher temperatures and erosive effects of a high pressure stream of water from a fire hose at the conclusion of the heat (fire) exposure.

Considerations in fire door design, in addition to retarding the advance of fire, include the cost of raw materials and the cost of fabrication. Furthermore, the weight of the door is important, both from the standpoint of ease of handling and cost of transportation. The strength of the door is also an important factor, since fire doors may be required to pass the above-described water stream test as well as have the requisite strength to withstand normal use and abuse.

Fire-resistant doors have been made using a variety of constructions and utilizing a number of different materials, including wood, metal, and mineral materials. Early forms of fire doors simply comprised wooden cores faced with metal sheeting. Although wood of ample thickness is an effective fire and heat retardant, doors of such construction tend to be heavy and are expensive to fabricate and transport.

Some fire-resistant cores are constructed using such materials as expanded perlite (which functions as a lightweight inorganic filler), gypsum (which functions as a fire resistant material bonding the perlite in an integral structure), cement (which functions as a further fire resistant material and counteracts shrinkage of the core), a solution of polyvinyl alcohol and water (which also acts as an organic binder and increases the viscosity of the mixture of ingredients while also hydrating the gypsum) and fiberglass (which functions as a reinforcing material). See for example U.S. Pat. No. 4,159,302.

According to U.S. Pat. No. 4,159,302 a fire resistant door core can be prepared by hydrating a composition containing about 50-70 percent by weight expanded perlite, about 10-30 percent by weight of calcined gypsum, 10-20 percent by weight of an hydraulic cement, such as Portland cement and 1-5 percent by weight of an organic binder, such as polyvinyl alcohol. The composition to be hydrated can also optionally contain up to 1 percent by weight of a fibrous reinforcement, up to 4 percent by weight clay and up to 4 percent by weight of unexpanded vermiculite. Cores made with this composition are disclosed as having a density between about 22 to about 30 pounds per cubic foot (pcf).

U.S. Pat. No. 6,648,965 describes a high density composition, i.e., a composition having a density between about 60 and 80 pounds per cubic foot (pcf), useful as a fire door core made by hydrating a mixture of ingredients typically containing about 3-12 percent by weight expanded perlite fines, about 60-80 percent by weight of calcined gypsum, and 4-10 percent by weight of an organic binder, such as polyvinyl alcohol. The composition to be hydrated also contains 1.5-7.5 percent by weight of a fibrous reinforcement.

Other fire doors have included conventional gypsum wallboard panels as a core material. However, in order to produce sufficient fire resistance, the thickness required of the wallboard is such as to result usually in an excessively heavy door. Furthermore, internal structural members such as rails or mullions have been found necessary to support and strengthen wallboard panels. The need for such reinforcing elements increases the cost of materials and assembly of such doors. In addition to the above-mentioned considerations, fire doors must, in order to be commercially acceptable, also have other properties that are related to the manufacture, installation and service of the fire door.

U.S. Pat. No. 6,340,389 describes a preferably gypsum-free fire door core made from expanded perlite (about 50 to 80 weight percent), a fireproof binder such as an alkali metal silicate (about 4 to 19 weight percent), fire clay or vermiculite, and optionally one or more viscosity-enhancing components, fiberglass, or both. The fire door core is made using a semi-continuous batch press method wherein water, the expanded perlite, the fireproof binder, fire clay or vermiculite are mixed; and the wet mixture is compressed in a mold, and the compressed mixture dried. Cores made with this composition are disclosed as having a density between about 24 to about 31 pounds per cubic foot (pcf).

U.S. Pat. No. 6,846,358 describes another building material composition, useful for example as a fire door core and to improved methods of making this composition. The building material is prepared from an aqueous mixture of expanded perlite (about 50 to 75 weight percent) and a fast setting, cementitious composition (about 20 to 50 weight percent) consisting essentially of a hydraulic cement having (1) a Portland cement and (2) a calcium aluminate cement, which composition is molded and shaped into a fire door core. Cores made with this composition are disclosed as having a density between about 22 to about 35 pounds per cubic foot (pcf).

BRIEF DESCRIPTION OF THE INVENTION

The present invention is directed to a fire-resistant building material composition. The present invention is specifically directed to a low density (i.e., lightweight) building material composition that is substantially free of any hydraulic cement, such as a Portland cement (also referred to as non-cement-containing), which composition can be used as a fire door core. The fire-resistant building material composition exhibits both an excellent green strength during manufacture and a sufficient strength post-manufacturing to be used as a heat-resistant door core in the manufacture of metal-faced fire doors.

Building material compositions (e.g., fire door cores) of the present invention, due in part to their high expanded perlite content and low gypsum content, have an improved insulating property and meet the fire-resistant capabilities of current fire door cores, while avoiding the need to use any hydraulic cement (such as Portland cement) in the materials used to fabricate the composition. As noted, the building material composition (e.g., fire door core) of the present invention avoids the use of hydraulic cement and also uses a much lower amount of set gypsum than known prior art gypsum binder-based compositions used in fire door cores. Surprisingly, the non-cement-containing building material composition (e.g., fire door core) of the present invention comprises as its main constituent expanded perlite with the perlite bonded into an integral structure with a second, minor, though essential binder component consisting essentially of a mixture of set gypsum and an organic binder, usually polyvinyl alcohol (that is a polyvinyl acetate which is substantially fully hydrolyzed) or a mixture of a polyvinyl alcohol and starch. These essential ingredients used to prepare the building material composition, upon hydration with water, can be molded, shaped and cured into a desired shape, such as for a fire door core. Upon being mixed with water in an amount within the range of about 15 to 45 percent by weight, more usually within the range of about 20 to 40 wt. %, and most often within the range of about 25 to 35 wt. %, of the dry mixture of the constituents, the resulting moist composition exhibits a suitable setting time for manufacturing door cores.

The fire door core may also contain, as a minor, optional (though often preferred) component, a fibrous reinforcement, most preferably chopped glass fibers.

Still other optional (minor) ingredients include unexpanded vermiculite, diatomaceous earth and clay.

A fire door core can be made by admixing (1) the expanded perlite, (2) calcined gypsum, (3) the organic binder, (4) an optional fibrous reinforcement and (5) other optional additives which may also be used, in the presence of (6) an amount of water at least sufficient to provide a moist, (damp) mixture of the ingredients and sufficient to fully hydrate the calcined gypsum. Water preferably is added in an amount of between about 15 to 45 wt % of the dry ingredients in the composition and more usually between about 20 to 40 wt % of the dry ingredients in the composition. The moistened composition can then be molded (with pressure) into the desired shape, including a desired thickness, and pressed to the desired density and cured to yield the fire door core.

DETAILED DESCRIPTION OF THE INVENTION

The fire resistant building material composition, preferably in the form of a fire door core, of the present invention comprises as a major component expanded perlite and as a second, minor (though essential), component a binder component consisting essentially of a mixture of set (i.e., hydrated) gypsum and an organic binder. The fire resistant building material composition of the present invention is substantially devoid of any hydraulic cement, especially a calcium silicate-based cement such as Portland cement. In other words, the ingredients used to produce the building material composition are substantially free of any hydraulic cement component. Substantially free means that there is less than 5 percent by weight of any hydraulic cement, preferably there is less than 1 percent by weight and for the most part there is absolutely no hydraulic cement in the mixture of ingredients used to make the building material composition of the present invention.

The fire resistant building material composition of the present invention is best characterized in terms of the constituent components (on a dry basis) used to make the composition notwithstanding the fact that at least in the case of the calcined gypsum component there is understood to be a chemical interaction or change that occurs in the presence of water (hydration) during the setting and curing of the composition as the final product is formed.

The main constituent used to make the building material composition (such as a fire door core) of the present invention is an expanded perlite. Expanded perlite is present in the mixture of ingredients used to produce the composition in an amount of about 70 to 90 weight percent based on the dry weight of the other ingredients. Expanded perlite is available in various forms as well known to those of ordinary skill in the art.

Speaking generally, expanded perlite can be formed by heating moisture-containing, natural-occurring perlite ore at a temperature within the range of about 1,500° to 2,000° F. (815° to 1093° C.) Such heat treatment explodes or expands the perlite to, for example, 15-20 times its original volume. Commercially available forms of expanded perlite known as cryogenic, plaster and concrete aggregate are exemplary of materials that can be used in the practice of the present invention.

Expanded perlite, suitable for use in the present invention, generally has a density from about 2 to about 11 lbs per cubic foot (pcf). Usually, an expanded perlite with a density of about 4 to 8 pcf will be used, such as a 6.5 pcf perlite. Furthermore, the particle size of the expanded perlite can vary over a wide range. Generally an expanded perlite having a particle size distribution that passes through a 30 mesh screen and is retained on a 100 mesh screen (U.S. Standard Sieve Series) should be suitable. Other suitable size distributions can be readily determined by skilled workers using routine testing.

The expanded perlite functions as a non-combustible, compactable filler which imparts light weight to the set (cured) composition, excellent insulation character and also relatively high strength as compared to other means which could be used to impart light weight to the set composition, for example, such as by attempting to introduce air voids into the set composition by foaming the mixture of ingredients from which the set composition is made.

To optimize strength properties of the composition, those forms of expanded perlite which are more resistant to being compressed or compacted to other more compactable forms should preferably be used. It has been observed that various forms of perlite are less spongy than others. The less spongy the perlite, the greater its resistance to being compressed and the greater the anticipated strength and insulation character of the building material composition made from the perlite.

Conversely, the more spongy the perlite, the more readily it is compressed and the lower the anticipated strength of the composition. See U.S. Pat. No. 4,159,302 for additional discussion.

While present as a minor component of the ingredients used to produce the fire resistant building material composition of the present invention, the non-cement-containing binder component, following hydration and setting (curing), becomes the principal constituent holding the building material composition together as a unitary construction or structure. The binder component of the present invention consists essentially of a mixture of (1) calcined gypsum, and (2) an organic binder.

The calcined gypsum is present in the mixture of ingredients used to make the building composition in an amount of 10 to 15 percent by dry weight of the mixture of the constituents; while the organic binder is present in an amount of about 1 to 10 percent by dry weight of the ingredients used to produce the fire resistant building material composition, more usually 1 to 5 percent. When used in connection with the binder component, the phrase "consisting essentially of" is intended to exclude the use of any significant amount of other inorganic binder ingredients such as hydraulic cement (particularly a Portland cement) or an alkali silicate. In particular, the amount of such additional inorganic binder ingredients should be less than 5 percent by weight of the total weight of the dry ingredients.

The main constituent of the binder component used to produce the fire resistant building material composition of the present invention is calcined gypsum. Calcined gypsum is in general produced by driving off water of hydration present in naturally-occurring gypsum (calcium sulphate dihydrate) through the use of heat. Depending on the degree of calcination, there is produced calcium sulfate hemihydrate ($CaSO_4 \cdot \tfrac{1}{2}H_2O$—Plaster of Paris) or another form of calcium sulfate (such as soluble anhydrate) which is capable of hydrating with water to form set gypsum, that is, calcium sulphate dihydrate. As well-known, set gypsum is formed by the recrystallization of calcined gypsum with water. The calcined gypsum is conveniently used in powdered form. As noted above, the calcined gypsum is present as an ingredient for making the building composition in an amount of 10 to 15 percent by dry weight of the mixture of ingredients used to prepare the fire resistant building material composition of the present invention.

The binder component of the ingredients necessarily used to produce the fire resistant building material composition of the present invention, especially a fire door core, also includes an organic binder. The organic binder can be present in an amount of about 1 to 10 percent by weight of the dry weight of the mixture of the ingredients used to prepare the fire resistant building material composition of the present invention, and usually is present in the range of about 1 to 5 percent. The organic binder can be a naturally-occurring material, or a synthetic material. Examples of the former include starches, dextrins and gums, especially starches. Examples of synthetic materials are resins such as polyvinyl alcohol, polyvinyl acetate, polymers of vinyl acetate and ethylene, polymers of styrene and butadiene, and acrylic resins.

The organic binder is typically a material which is dispersible or soluble in water. Indeed, in many cases the organic binder will be introduced as an aqueous solution or dispersion during the preparation of the building material composition, with the water introduced with the organic binder supplying at least a portion of the water required by the process for making the ultimate product, i.e., for hydrating the calcined gypsum as the composition sets and cures.

One preferred organic binder is a polyvinyl alcohol, a well known commercially available material. Speaking generally, polyvinyl alcohol is prepared by hydrolyzing a polyvinyl acetate. The source of the polyvinyl alcohol is preferably a substantially completely hydrolyzed form of polyvinyl acetate, that is, about 97 to 100% hydrolyzed polyvinyl acetate. A suitable polyvinyl alcohol can be cold-water insoluble. In this case, solutions also can be prepared at elevated temperatures, for example, at temperatures of about 140° to 205° F. (60° to 96° C.). Commercially available polyvinyl alcohols for use in the composition of the present invention are available from the Dupont Company under the registered trademark "Elvanol." Examples of such products are Elvanol®, Grades 90-50, 71-30, 72-60 and 70-06. Another suitable binder is starch, such as Staramic® 747, a cold water soluble hydroxyethylated corn starch available from AE Staley (now believed to be owned by Tate & Lyle). Indeed, a combination of a polyvinyl alcohol and starch also is contemplated. The organic binder can be included in the building material composition in an amount of up to about 10 percent by weight, and usually up to about 5 percent by weight, such as from about 1 to 5 percent, usually about 3 percent or less, such as from 1 to 2 percent, each of these percents is based on the dry weight of the ingredients used to form the building material composition, e.g., the fire door core.

An important aspect of the present invention is that the fire resistant building material composition, e.g., fire door core, of the present invention does not include hydraulic cement (such as Portland cement) as an essential constituent. Applicant has surprisingly determined that it is not necessary to use a hydraulic cement in order to produce a unitary structure of sufficient green strength during production and having sufficient strength and integrity after final assembly suitable for use as a fire door core, particularly for use in metal faced fire doors. This result is surprising in the present context given the relatively small amount of binder component, and especially the small amount of calcined gypsum, used in the mixture of ingredients from which the building material composition is prepared.

Another important ingredient of the fire resistant building composition of the present invention is a fibrous reinforcement. The fibrous reinforcement ingredient contributes to desired flexural and compressive strengths and general handling characteristics of the building material composition, both during its preparation in terms of its "green" strength and the strength of the final cured composition. While a desired strength characteristic may be achieved without the use of the fibrous reinforcement, this undesirably increases the density of the product. Thus, use of a small but effective amount of a fibrous reinforcement generally is preferred.

The fibrous reinforcement also imparts impact-resistant properties to the set composition, and provides better handling properties to improve resistance to cracking or breakage during shipment or processing of the door core. As fibrous reinforcements glass fibers are preferred. Examples of other fibrous reinforcements that can be substituted for glass fibers or used in combination therewith are mineral fibers (such as Wollastonite and mineral wool) sisal fibers, graphite fibers, and synthetic fibers such as, for example, polyolefin fibers, such as polyethylene fibers and polypropylene fibers, rayon fibers and polyacrylonitrile fibers. The fiber reinforcement also may further improve the material handling properties of the wet mixture, e.g., the wet door core mixture and especially the wet composite, e.g., the wet door core (often referred to as the "green strength"). Typically, when used, the amount of fiber reinforcement is no more than about 2 percent by weight, such as from 0.2 to 2 percent, usually about 1 percent or less, such as from 0.2 to 1 percent, more usually, from about 0.2 to about 0.7 percent, each of these percents is based on the dry weight of the ingredients used to form the fire resistant building material composition, e.g., the fire door core.

Still other optional ingredients also may be included in the fire door construction, such as unexpanded vermiculite (to enhance fire resistant properties of the set composition and to counteract any tendency of the cured composition to shrink at elevated temperatures thereby imparting improved dimensional stability properties to the set composition during exposure to heat) and clay (to improve fire resistant and high temperature, dimensional stability properties). These optional additional ingredients do not prevent the composition from fulfilling, and in many cases may enhance the composition's utility in fire resistant applications.

Clays are natural, earthy, fine-grained materials, most of which exhibit plastic characteristics when moistened with limited amounts of water. In general, clays comprise primarily alumina, silica and water and may also contain to a lesser extent iron, alkali, alkaline earth and other metals. The various types of clays in general have particles ranging in size from fractions of a micron to about 40 microns, although some materials having particles of an even larger size are also considered clays. It should be understood that materials which do not have all of the above characteristics, but which nevertheless are generally referred to as clays because they have one or more of the above characteristics are included within the term "clay" as used herein. Examples of the types of clay that can optionally be utilized are: kaolinitic clays—including, for example, kaolin (also referred to as china or paper clays), ball clay, fireclay, and flint clay, which clays are comprised predominantly of the clay mineral kaolinite. A preferred clay optionally used in the practice of the present invention is kaolinite.

The building material composition when used as a fire door core in accordance with the present invention is expected to provide one or more of the following advantages over currently used fire-resistant door core compositions, including but not limited to, increased production capabilities using methods known to those of ordinary skill, decreased raw material consumption, good adhesion to metal door shells, acceptable tensile and flexural strengths, decreased weight, and better shaping and handling characteristics.

The phrase "consisting essentially of" when used in connection with the present invention and in the claims is intended to exclude not only the use of ingredients that would destroy the fire resistant property of the composition, but in the case of defining the binder component, also to exclude the use of other inorganic binders in amounts in excess of about 5% by weight.

As to amounts of ingredients preferably utilized in the practice of the present invention, the fire resistant building material composition preferably comprises the set or cured product of an aqueous mixture of the following ingredients, the recited percentages reflecting the total dry weight of the ingredients in the mixture:

(A) about 70 to about 90 wt. % of expanded perlite;
(B) about 10 to about 15 wt. % of a calcined gypsum;
(C) up to about 10% and preferably about 1 to about 5 wt. % of an organic binder;
(D) up to about 2 wt. % and preferably about 0.2 to 1% of fibrous reinforcements,
(E) 0 to about 4 wt. % of clay; and
(F) 0 to about 4 wt. % of unexpanded vermiculite.

In a more preferred form, the aforementioned aqueous mixture includes, based on the total dry weight of the ingredients in the mixture:

(A) about 70 to about 90 wt. % perlite;
(B) about 10 to about 15 wt. % of calcined gypsum;
(C) at least about 2 wt. % of an organic binder;
(D) at least about 0.5 wt. % of a fibrous reinforcement
(E) 0 to about 4 wt. % of unexpanded vermiculite; and
(F) 0 to about 4 wt. % of clay.

The building material composition, e.g., fire door core, of the present invention is manufactured is a straightforward manner by combining the various components (most supplied as dry ingredients) with water to form a wet mixture, e.g., a wet door core mixture. The amount of water to use in making a set composition, such as a door core, is at least sufficient to provide the stoichiometric amount of water needed to cause the setting (curing) of the calcined gypsum. It is generally desirable to include an amount of water in excess of the stoichiometric amount. In certain embodiments, it may be preferred to use only an amount of water sufficient to provide a damp (moist) mixture of the ingredients. In most cases, a set door core can be prepared readily by using from about 15 to about 45% by weight of water based on the dry weight of the ingredients comprising the aqueous mixture. Usually, an amount of water in the range of about 20 to 40 wt. % should be suitable for preparing a wet door core mixture.

The wet mixture, e.g., the wet door core mixture, then is molded and pressed as needed to form a wet composite, e.g., a wet door core. The wet composite, e.g., wet door core, then is dried (set and cured) to form the fire resistant building material composition, e.g., the fire door core, of the invention. One of the surprising discoveries of the present invention is that notwithstanding the low amount of binder component in the mixture of ingredients and the absence of any hydraulic cement in the mixture, the wet composite exhibits an excellent green strength facilitating the handling of the wet composite through the remainder of the manufacturing operations.

The fire resistant building material composition, e.g., the fire door core, of the present invention may contain still other optional components as long as these other components do not adversely affect the advantageous properties, especially the fire resistant property, of the composition, e.g., the fire resistant property of the fire door core, of the present invention. Another optional ingredient is diatomaceous earth. Diatomaceous earth is predominately silica and is composed of the skeletal remains of small prehistoric aquatic plants related to algae (diatoms). Particles of diatomaceous earth typically have intricate geometric forms. The irregular particle shapes may improve the overall binding of the composition together and the resultant strength of the composition. Generally, the amount of such other optional components, such as diatomaceous earth is less than about 10 weight percent of the building material composition, e.g., the fire door core. In the case of the diatomaceous earth in particular, when used the diatomaceous earth will generally be used in an amount of from about 1 to 10 weight percent, more usually from about 2 to about 8 weight percent and most often from about 3 to about 6 weight percent of the building material composition, e.g., the fire door core. The amount of these optional components is preferably less than about 10 weight percent, even more preferably the amount is less than about 5 weight percent.

In accordance with the present invention, a semi-continuous batch press mold method provides a suitable way for producing product using the fire-resistant building material composition of the present invention. In accordance with the semi-continuous batch press mold method, the ingredients of the building material composition, e.g., the fire door core, and the hydration water are mixed in a suitable mixing device to produce the wet mixture, e.g., the wet door core mixture. Mixing devices suitably used in this step of the process are well known to skilled practitioners. Preferably, the dry ingredients are mixed with an amount of water no greater than that required to provide a damp (moist) mixture of the ingredients and then molding and compressing the damp mixture to form the core as described below. It is preferred that the ingredients of the composition, e.g., the fire door core ingredients, be mixed in a manner such that the expanded perlite is substantially unbroken. In order to substantially eliminate the breaking of the expanded perlite during mixing, preferably the other components of the composition, e.g., the other fire door core ingredients, are mixed together first. This allows the expanded perlite to thoroughly blend with the other ingredients with a minimum of mixing. The amount of expanded perlite broken during the mixing process can be determined by comparing the volume of the wet mixture, e.g., the wet door core mixture before and after mixing.

The wet mixture, e.g., the wet door core mixture then is transferred to a mold having a shape corresponding to desired composite dimensions. Typically, a door core is molded to form a slab having the dimensions 36"×84"×1¾". The moist mixture transfer step into the press mold can be accomplished using any of the techniques well known to skilled practitioners. The wet mixture, e.g., the wet door core mixture then is compression molded to compact the mixture to the desired density and thickness to produce a wet composite, e.g., a wet door core.

The press molding of the present invention can use any means of pressure well known to skilled practitioners and suitable equipment is well known to the skilled worker. Typically, the amount and length of pressure applied is sufficient to bind the ingredients together in a composition, e.g., in a door core, that has a density from about 18 to about 23 pounds per cubic foot, more usually about 20 to about 23 pounds per cubic foot, after drying, while at the same time being insufficient to break or crush a significant number of the expanded perlite particles. It is expected that satisfactory results will be obtained by compressing the damp mixture to about 25 to about 33% of its original volume, utilizing pressures within the range of about 90 to about 170 psi for about 15 to about 55 seconds. As skilled practitioners will recognize the exact pressure and time required will vary for different embodiments of the present invention and based on the foregoing teachings a suitable pressure and time schedule can be determined using only routine testing. The wet composite, e.g., the wet door core then is transferred to a drying area.

The wet composite, e.g., wet door core, then is dried (cured) to produce the building material composition, e.g., the fire door core of the present invention. The wet composite, e.g., the wet door core is cured (i.e., dried) at a temperature and for a time sufficient to substantially eliminate excess water from the wet composite, e.g., from the wet door core. Although the drying can be accomplished at ambient temperature, drying at elevated temperatures may often be preferred. For example, drying of the wet composite, e.g., the wet door core, may be carried out at a temperature from about 150° to about 300° Fahrenheit (about 65° to 150° C.), for a time from about 4 to about 8 hours, with lower temperatures requiring longer times. Skilled practitioners recognize that specific curing times and temperatures will depend on the exact composition of the wet composite, e.g., the wet door core and suitable temperature and time schedules can be determined using routine testing.

After the core has been dried, finishing operations can be effected. For example, the core can be sanded to a thickness within the required tolerance, sawed or shaped as desired. The nature of the dried material is such that finishing operations can be performed readily. Thereafter the material can be used to assemble the door, preferably a metal door construction where a metal facing (metal sheet) encases the door core composition of the present invention.

During the course of finishing operations such as sanding and sawing, core dust is produced. In accordance with this invention, it is anticipated that the dust can be used in preparing other cores by including it in the mixture from which the core is made. This is advantageous because it makes use of a material that would otherwise be waste requiring disposal. The use of core dust is expected to increase the density of the core. Accordingly, the maximum amount of core dust used will be governed by the desired density of the core. It is recommended that the core dust comprise no more than about 6 wt. % of the total dry weight of the mixture of ingredients. Preferably, the core dust should comprise no more that about 2 to about 4 wt. % of the mixture.

The following non-limiting example further illustrates the invention.

EXAMPLE 1

A door core of the present invention of the following composition can be manufactured from a mixture of the following ingredients:

| Ingredients | Amount (dry weight percent) |
| --- | --- |
| Expanded perlite | 85.3 |
| Calcined Gypsum (hemihydrate) | 12.2 |
| Polyvinyl alcohol | 2 |
| Glass Fibers | 0.5 |

Water in an amount of about 20-40 weight percent of the dry ingredients should be added and the door core can be produced by pressing at about 150 psi and drying (curing) the pressed core at about 250° F. (120° C.) for about 4-5 hours.

It will be understood that various changes in the details, materials and arrangements of parts which have been herein described and illustrated in order to explain the nature of the invention, may be made by those skilled in the art within the principle and scope of the invention as expressed in the appended claims. Unless otherwise specifically indicated, all percentages are by weight. Throughout the specification and in the claims the term "about" is intended to encompass + or −5%.

I claim:

1. A method for making a fire door core from a wet mixture of materials, which method comprises:
   mixing water, expanded perlite, a binder component consisting essentially of calcined gypsum and an organic binder, and a fibrous reinforcement,
   wherein, on a water-free basis, the expanded perlite comprises about 70 to about 90 weight percent of the wet mixture, the calcined gypsum comprises about 10 to 15 weight percent of the wet mixture, the organic binder comprises about 1 to about 10 weight percent of the wet mixture and the fibrous reinforcement comprises about 0.2 to about 1 weight percent of the wet mixture, the water being present in an amount in excess of the stoichiometric amount needed to hydrate the calcined gypsum and sufficient to provide a damp mixture but less than an amount which would produce an aqueous slurry of the intermixed ingredients, placing a charge of the damp mixture in a pressure mold of slab form, applying sufficient pressure to the damp charge in the mold to compress the charge to about 25% to 33% of its original volume, maintaining the pressure until the compression strength of the compressed charge is at least about 50 psi, removing a molded slab from the pressure mold, and thereafter drying the slab by heating sufficiently to remove excess water, wherein the wet mixture contains less than 5 wt % of hydraulic cement.

2. The method of claim 1 wherein the expanded perlite has a density of about 6.5 lb./cu. ft.

3. The method of claim 1 wherein the organic binder is present in an amount of 1 to 5 percent and is selected from the group consisting of polyvinyl alcohol, starch and mixtures thereof.

4. The method of claim 1 in which the intermixed ingredients further include unexpanded vermiculite in an amount not greater than about 4 wt. % of the dry ingredients.

5. The method of claim 1 in which the intermixed ingredients further include clay in an amount not greater than about 4 wt. % of the dry ingredients.

6. A method for making a fire door core from a wet mixture of materials, comprising:

mixing water, expanded perlite, a binder component consisting essentially of calcined gypsum and an organic binder, and a fibrous reinforcement to produce a mixture, wherein the mixture contains less than 5 weight percent of hydraulic cement, wherein, on a water-free basis, the mixture comprises about 70 weight percent to about 90 weight percent of the expanded perlite, about 10 weight percent to about 15 weight percent of the calcined gypsum, about 1 weight percent to about 10 weight percent of the organic binder, and about 0.2 weight percent to about 1 weight percent of the fibrous reinforcement;

placing a charge of the mixture in a mold;

applying sufficient pressure to the charge in the mold to compress the charge to about 25% to 33% of its original volume;

maintaining the pressure until the compression strength of the charge is at least about 50 psi;

removing a compressed article from the mold; and thereafter drying the compressed article by heating sufficiently to remove excess water.

7. The method of claim 6 wherein the mixture contains less than 1 weight percent of hydraulic cement.

8. The method of claim 6 wherein the expanded perlite has a density of about 6.5 pounds per cubic foot.

9. The method of claim 6 wherein the organic binder is present in an amount of 1 weight percent to 5 weight percent, and wherein the organic binder is selected from the group consisting of: polyvinyl alcohol, starch, and mixtures thereof.

10. The method of claim 6 wherein, on a water-free basis, the mixture further comprises unexpanded vermiculite in an amount not greater than about 4 weight percent.

11. The method of claim 6 wherein, on a water-free basis, the mixture further comprises clay in an amount not greater than about 4 weight percent.

12. The method of claim 6 wherein the compressed article has a density of about 20 pounds per cubic foot to about 21 pounds per cubic foot.

13. The method of claim 6 wherein the water is present in an amount in excess of the stoichiometric amount needed to hydrate the calcined gypsum and sufficient to provide a damp mixture but less than an amount that would produce an aqueous slurry of the mixture.

14. The method of claim 6 wherein the mixture comprises about 15 weight percent to about 45 wt % water, based on the dry weight of the expanded perlite, the binder component, and the fibrous reinforcement.

15. The method of claim 6 wherein the mixture is free of hydraulic cement.

16. The method of claim 6 wherein drying the compressed article by heating sufficiently to remove excess water is carried out at a temperature of about 150° F. to about 300° F. for a time of about 4 hours to about 8 hours.

17. The method of claim 6 wherein applying sufficient pressure to the charge in the mold comprises applying a pressure of about 90 pounds per square inch to about 170 pounds per square inch to the charge in the mold for about 15 seconds to about 55 seconds.

18. The method of claim 6 wherein:

the mixture comprises about 15 weight percent to about 45 wt % water, based on the dry weight of the expanded perlite, the binder component, and the fibrous reinforcement, drying the compressed article by heating sufficiently to remove excess water is carried out at a temperature of about 150° F. to about 300° F. for a time of about 4 hours to about 8 hours, and applying sufficient pressure to the charge in the mold comprises applying a pressure of about 90 pounds per square inch to about 170 pounds per square inch to the charge in the mold for about 15 seconds to about 55 seconds.

19. The method of claim 6 wherein:

the mixture comprises about 15 weight percent to about 45 wt % water, based on the dry weight of the expanded perlite, the binder component, and the fibrous reinforcement, the mixture contains less than 1 weight percent of hydraulic cement, drying the compressed article by heating sufficiently to remove excess water is carried out at a temperature of about 150° F. to about 30020 F. for a time of about 4 hours to about 8 hours, and applying sufficient pressure to the charge in the mold comprises applying a pressure of about 90 pounds per square inch to about 170 pounds per square inch to the charge in the mold for about 15 seconds to about 55 seconds.

20. The method of claim 6 wherein:

the mixture comprises about 15 weight percent to about 45 wt % water, based on the dry weight of the expanded perlite, the binder component, and the fibrous reinforcement, the mixture is free of hydraulic cement, drying the compressed article by heating sufficiently to remove excess water is carried out at a temperature of about 1500 F. to about 300° F. for a time of about 4 hours to about 8 hours, and applying sufficient pressure to the charge in the mold comprises applying a pressure of about 90 pounds per square inch to about 170 pounds per square inch to the charge in the mold for about 15 seconds to about 55 seconds.

* * * * *